March 18, 1924.
W. F. PETERSEN
BAKER'S OVEN
Filed June 3, 1922        2 Sheets-Sheet 1
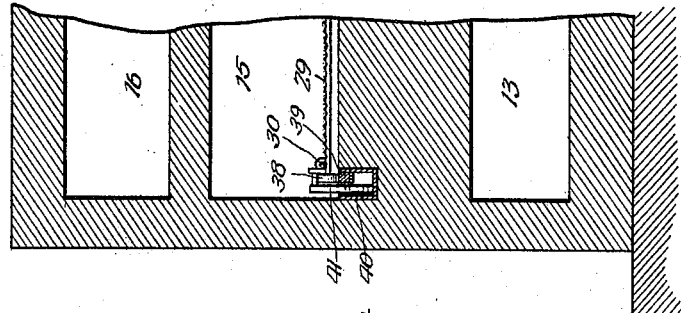
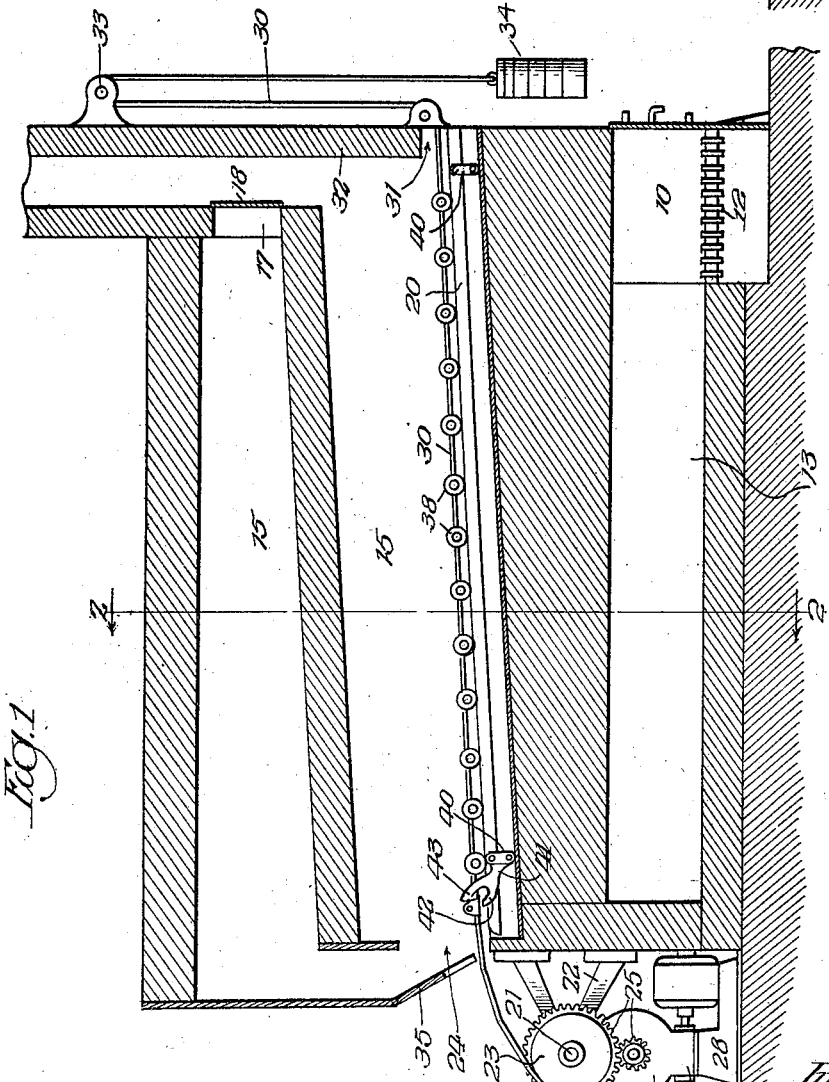

March 18, 1924.
W. F. PETERSEN
BAKER'S OVEN
Filed June 3, 1922    2 Sheets-Sheet 2
1,487,121
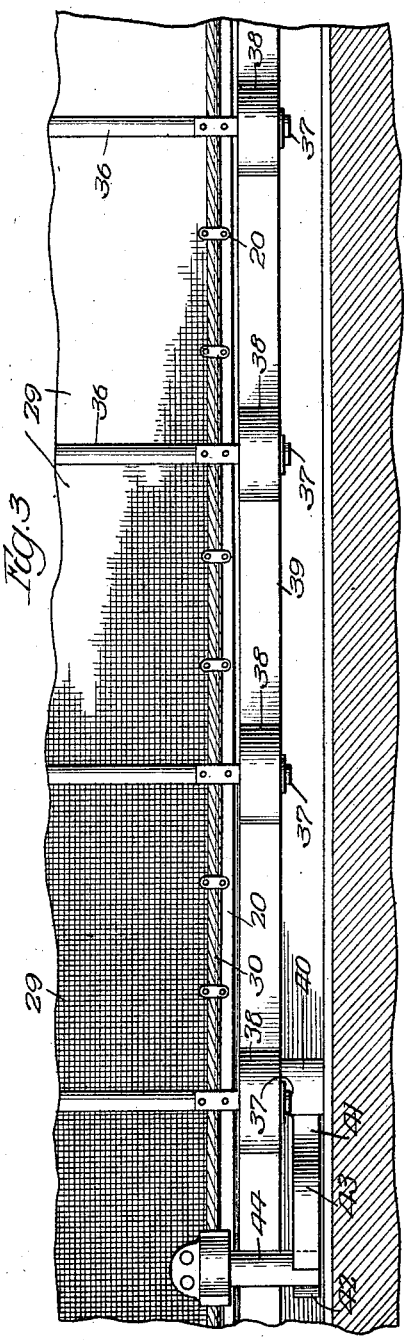
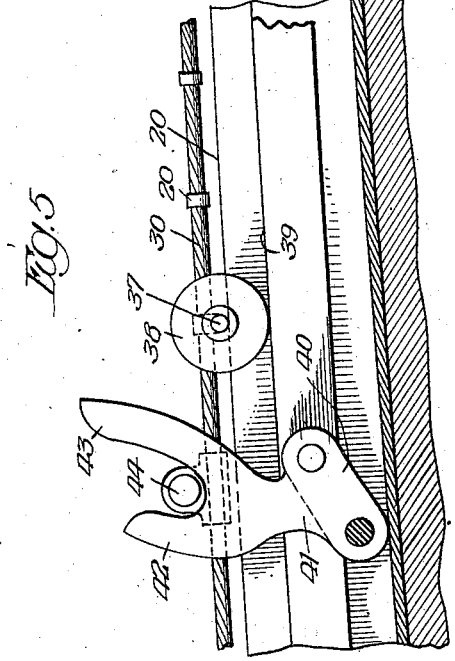
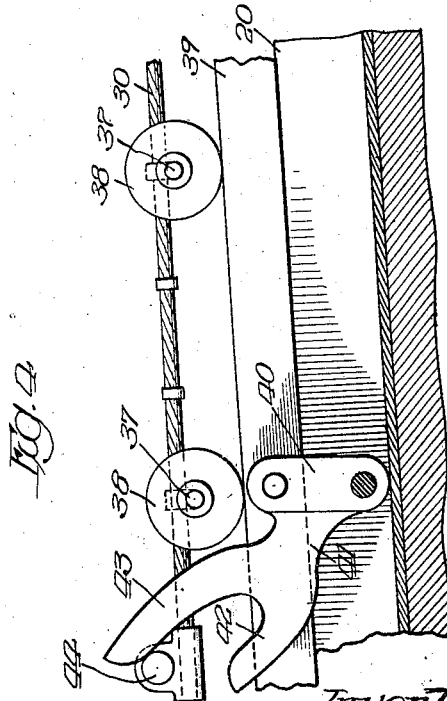

Patented Mar. 18, 1924.

1,487,121

UNITED STATES PATENT OFFICE.

WILLIAM F. PETERSEN, OF CHICAGO, ILLINOIS.

BAKER'S OVEN.

Application filed June 3, 1922. Serial No. 565,705.

*To all whom it may concern:*

Be it known that I, WILLIAM F. PETERSEN, a citizen of the United States, residing at Chicago, in the county of Cook and State of Illinois, have invented certain new and useful Improvements in Bakers' Ovens, of which the following is a full, clear, and exact description.

The object of this invention is to hasten the baking of bakery products and to do this without changing the general construction of the type of bakers' ovens to which my improvements are applicable, and without increasing the heat generating features of the same.

More specifically the invention consists of bringing the means employed to carry the bakery products into such intimate relation with the heated hearth of the baking chamber of the oven, as to practically eliminate the air space between said means and the hearth, and thus enable said products to get nearer the hottest part of said chamber and bake sooner, and then to raise said means and bakery products above said hearth while the same are being withdrawn from said chamber to provide an air space under the same that will prevent the underside of said products from burning while being withdrawn.

A more concrete understanding of my invention may be obtained from the following detailed description, taken in connection with the claims.

In the drawings:

Figure 1 is a vertical longitudinal section through an oven comprising the improvements of my invention.

Figure 2 is a transverse section of about one half of the same, taken on dotted line 2, 2, Figure 1.

Figure 3 is a transverse section of a portion of the oven, just above the plane of the hearth, drawn to a larger scale.

Figures 4 and 5 are side views of fragments thereof, in which the track carriers are shown in different positions.

Referring more particularly to the drawings, 10, is the heat generating chamber of an oven, the rear end of which has a furnace provided with the conventional grate-bars 12. A flue 13 extends forward from this chamber 10, and at its end opposite the furnace is provided with two vertical passages (not shown), that extend up through the side-walls of the oven on each side of the baking-chamber 13 thereof, to a top flue 16, that extends rearwardly over the baking-chamber 15, and communicates at its rear end with an outlet 17 for the discharge of the products of combustion. The front of the baking-chamber 15 communicates with the flue 16 of the outlet 17, and is provided with a damper 18 mounted in said outlet 17 for restricting the escape of heat from the front of the oven.

The floor 20 of the baking-chamber 15, as a surface, is preferably, inclined upwards from its front to its rear end, and it has a longitudinal channel, 14, on each side of the same practically throughout its length, and a movable hearth is adapted to move longitudinally thereon, as will hereinafter be more fully explained.

Referring specifically to the mechanism constituting my invention, I provide a drum 23, carried on a transverse shaft 21 supported in suitable bearings 22, 22, that are mounted below and on both sides of the inlet opening 24 of the baking-chamber.

The shaft 21 is driven through a reduction gearing 25 by an electric motor 26. The motor being connected with the reduction gear by a worm and worm-gear (not shown), carried in the housing 27 which latter is mounted as a unit on a suitable base 28.

The movable hearth, hereinbefore referred to, consists of a series of articulated wire trays 29 the forward end of which is secured to the drum 23, and which extends from this drum, when in its baking position, to the rear wall. The side edges of these trays are secured in a suitable manner to cables 30 the rear ends of which pass through an opening 31 in the rear-wall 32 of the oven and then up over suitable sheaves 33, 33, and then to a common weight 34 connected to the rear pendent ends thereof.

The motor 26 or driving device, is adapted to move the hearth in both directions, said hearth being drawn into the oven by means of the weight 34 and drawn out of the oven by means of the motor. A door 35 controls the inlet opening 24 of the oven, and when the hearth is being loaded with the bakery stuff in the usual pans that are set upon the trays, this door is opened, and when the hearth has reached the limit of its rearward movement to bake the bakery stuffs, said door is closed.

It is advisable to load the movable hearth when it is being moved toward the rear, at a suitable space above the floor of the baking-chamber, 15, and when the hearth has reached the rearward limit of its movement, to lower the same so that the hearth practically rests upon said floor, and then, when the baking process is completed, to move the hearth back again toward the front of the oven at a space above said floor. This gives the baked products on the hearth practically an equal time within which to be subjected to the baking bear throughout the length of the hearth. If the hearth was in contact with the floor of the baking-chamber, both while going into and coming out of said baking chamber, it would burn the bottom of the baking products. I accomplish this result by providing the hearth with transverse bars 36, 36, which extend beyond the side cables to which they are suitably secured and have their projecting ends provided with spindles 37 upon which wheels 38 are mounted. These wheels 38 run back and forth upon tracks 39 which are placed in troughs on either side next the sidewalls of the baking chamber substantially throughout the length of the same, or of a length enabling said tracks to move longitudinally from their upper positions in which they are in when the hearth is being loaded to said lower positions in which they are in during the baking operation. These rails are pivotally secured to and supported by links 40, 40, that are permanently fulcrumed at their lower ends to the outer sidewalls of the channels, 14, substantially as shown in the drawings. Near both ends of the baking chamber and the link 40 at the forward ends of said tracks, are provided bifurcated lugs 41, 41, which project upwards from the forward side of the links 40. The bifurcations of this lug are an unequal length, the smaller bifurcation, 42, being near the front of the baking chamber and the longer bifurcation, 43, to the rear thereof. The hearth is provided with laterally projecting fingers 44, that project from a clamp 45 of suitable construction that enables it to be secured to the cable and to the wire or screws or bolts. These pins are so located that, when the hearth has been moved to within a short distance of the rear limit of its movement, they will ride over the shorter bifurcation 42 and engage the longer bifurcation 43 and move the links, lugs, trays, and tracks to the rear. As the tracks move to the rear they describe a downward segment, until the hearth comes in contact with the floor of the baking-chamber, whereupon the lugs 41 will be in the position shown in Figure 5 of the drawings. When the baking process is completed and the hearth is moved forward again by the motor, the pins 44, which are between the bifurcations when the hearth is practically in contact with the floor of the baking-chamber, will engage the shorter bifurcations 42, and will move the links so as to raise the tracks and the hearth above the floor, in which position the hearth and the tracks will be in the position shown in Figure 4 of the drawings.

What I claim as new is:

1. A baker's oven comprising a baking chamber having longitudinal channels between its sidewalls and floor, a flexible hearth movable into and out of said chamber, tracks in said channels upon which said hearth rests, links whose upper ends are pivotally connected to said tracks and whose lower ends are permanently fulcrumed independently of the tracks, bifurcated lugs projecting from one of said links, and a pin projecting from said hearth that engages the bifurcations of said lugs when said hearth about reaches the rear limit of its movement.

2. A baker's oven comprising a baking chamber having longitudinal channels between its sidewalls and floor, a flexible hearth movable into and out of said chamber, tracks in said channels upon which said hearth rests, links whose upper ends are pivotally connected to said tracks and whose lower ends are permanently fulcrumed independently of the tracks, bifurcated lugs projecting from the forwardmost of said links, pins projecting from the forwardmost of said links, for each track the bifurcation nearest the front of the chamber being shorter than the other, and pins projecting laterally from the hearth near the front end thereof that engage the longer bifurcation when moved rearward and the shorter bifurcation when moved near, and rock said tracks downwards and upwards.

In witness whereof, I have hereunto set my hand this 29th day of April, 1922.

WILLIAM F. PETERSEN.

Witnesses:
VIOLET WARDELL,
ALEXANDER A. BALE.